(12) United States Patent
Krotts et al.

(10) Patent No.: US 8,020,521 B2
(45) Date of Patent: Sep. 20, 2011

(54) ATTRACTANT ENHANCED APPARATUS FOR CATS

(75) Inventors: Dean B. Krotts, Hartland, WI (US); Adam M. Kellogg, Oconomowoc, WI (US)

(73) Assignee: SportPet Designs, Inc., Waukesha, WI (US)

( * ) Notice: Subject to any disclaimer, the term of this patent is extended or adjusted under 35 U.S.C. 154(b) by 5 days.

(21) Appl. No.: 12/587,294

(22) Filed: Oct. 5, 2009

(65) Prior Publication Data

US 2011/0079183 A1 Apr. 7, 2011

(51) Int. Cl.
*A01K 29/00* (2006.01)
(52) U.S. Cl. ........................................ 119/711; 119/707
(58) Field of Classification Search .................. 119/702, 119/707, 708, 709, 710, 711; 446/72, 73, 446/76
See application file for complete search history.

(56) References Cited

U.S. PATENT DOCUMENTS

| | | | |
|---|---|---|---|
| 4,771,732 A | 9/1988 | Carney | |
| 6,345,593 B1 | 2/2002 | Stewart et al. | |
| 6,557,494 B2 * | 5/2003 | Pontes | 119/707 |
| 6,663,457 B2 | 12/2003 | Ritchey | |
| 7,150,245 B2 | 12/2006 | Lamstein | |
| 2003/0213440 A1 * | 11/2003 | Kelly | 119/708 |
| 2006/0254530 A1 | 11/2006 | Askinasi | |
| 2007/0234969 A1 * | 10/2007 | Lynch | 119/707 |
| 2008/0149041 A1 | 6/2008 | Lamstein et al. | |
| 2009/0084325 A1 * | 4/2009 | Moskoff | 119/707 |
| 2009/0194036 A1 * | 8/2009 | Lou | 119/709 |
| 2010/0199921 A1 * | 8/2010 | Haaf et al. | 119/706 |

OTHER PUBLICATIONS

Petco website, www.petco.com, Cat Scratch Toys, Date: Dec. 2, 2009, 3 pages.
Easy Pet Store.com website,www.easypetstore.com, Cat Scratch Toys, Date: Dec. 2, 2009, 2 pages.
Cat Connection website, www.thecatconnection.com, Cat Scratch Toys, Date: Dec. 2, 2009, 4 pages.
A Cat Store website,www.acatstore.com, Cat Scratch Toys, Date: Dec. 2, 2009, 2 pages.

* cited by examiner

*Primary Examiner* — T. Nguyen
(74) *Attorney, Agent, or Firm* — Ryan Kromholz & Manion, S.C.

(57) ABSTRACT

An attractant apparatus for use by animals. This apparatus is characterized as having surfaces on which the animal can play, scratch, and rub and a retainer for an animal attractant, such as catnip, used to induce such activity. The retainer may be opened to allow for the introduction and removal of the attractant. This cover is characterized as permitting odors emanating from the catnip to pass through, so as to induce play in the animal. An overlay partially covers the retainer to restrict direct access by the animal to the attractant held within the retainer, but allows partial access near the retainer and an additional surface and area for playing.

18 Claims, 2 Drawing Sheets

ATTRACTANT ENHANCED APPARATUS FOR CATS

BACKGROUND OF THE INVENTION

The present invention relates to amusement apparatuses for pets. In particular, this invention relates to an apparatus with an accessible receptacle or retainer containing an odor emitting animal attractant, such as catnip, to stimulate play and provide entertainment for animals.

For example, the house cat is a popular pet due to its personality and high energy. One way that cat owners stimulate play and high energy is by exposing the cat to catnip, or *nepatia cataira*. Catnip is non-toxic, but it has a hallucinogenic effect upon cats. Some reactions to catnip include sniffing, licking, chewing, scratching, chin and cheek rubbing, rolling, and body rubbing.

Many cat toys utilize catnip to attract cats and stimulate play. In an effort to ensure that only the scent and not the catnip itself is accessible by the cat, the catnip is typically embedded deep within the toy. This limits the scent, and thus, the anticipated catnip response. Additionally, some toys permanently seal the catnip within the toy. In such toys, the catnip may become stale after a period of time and the entire toy must be replaced.

Other animals, such as dogs, also enjoy play stimulated by an odor emitting animal attractant, such as a dog bone or treat.

Accordingly, there is a need for an entertainment apparatus that can provide maximum exposure to the odor emitting animal attractant, such as catnip, and at the same time provide for replacement of the attractant to maximize longevity of the toy.

SUMMARY OF THE INVENTION

The present invention provides such an apparatus for animals that contains a replaceable animal attractant such as, but not limited to, items that emit noises or odors. In the preferred embodiment, the animal attractant is catnip, but may also be any other substance to which an animal shows an attraction or a noise-making toy. With this invention, the pet owner places the selected attractant within a retainer. The retainer is adapted to restrict the animal's direct access to the attractant, by, for example, a piece of material holding an item in place or enclosing a retaining area, but still allows sensory engagement with the attractant. For example, if the attractant is catnip, this partial access still allows the "catnip effect" to be induced, and stimulates the cat to scratch, rub, and play.

According to the present invention, a piece of overlaying, material that covers the retainer and a portion of a planar base may be representative of a mouse or other recognizable figure, comprising ears and a tail which has both an aesthetic purpose and an additional entertainment purpose for the animal.

The overlay is releasably attachable to at least one margin of a planar, carpet-like base so that it can be lifted from the base to provide access by the owner to the retainer for receiving the animal attractant. The overlay is designed to be slightly longer than the base so that when attached, a gap is formed between the overlay and the base. This gap allows the animal to have partial access between the two layers, and allows the animal to get closer to the attractant retainer.

The retainer that holds the catnip or other animal attractant may be covered by a piece of gas permeable or other porous, woven material to allow the scent to escape from the retainer.

The retainer is also preferably releasably attached in order that it can be opened to remove and replace attractant, such as catnip, once it has become stale and its scent has diminished. This allows the apparatus to be functional as an amusement apparatus for a longer period of time.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
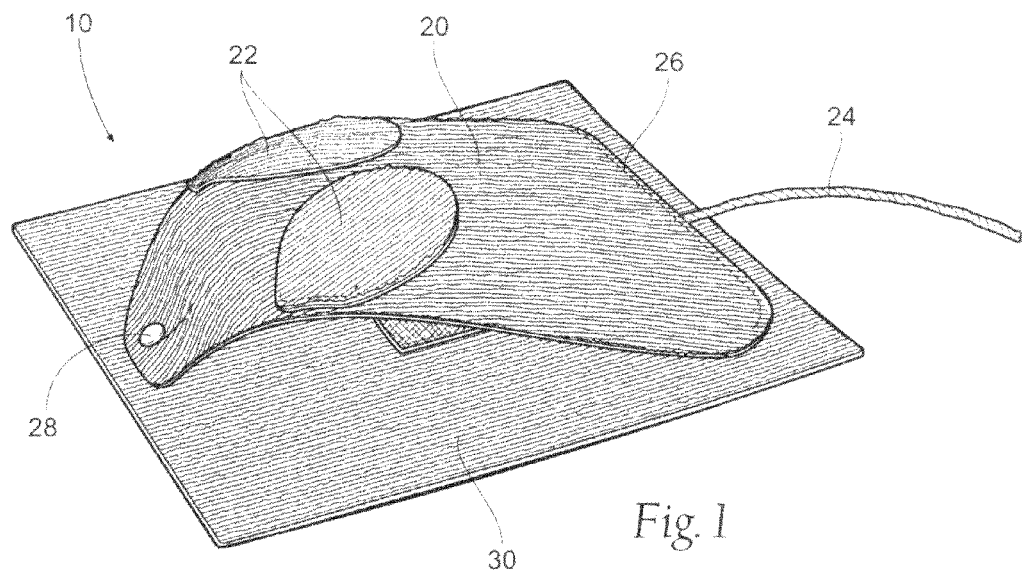
FIG. 1 is a perspective view of an entertainment apparatus for cats according to the present invention.
Figure 2:
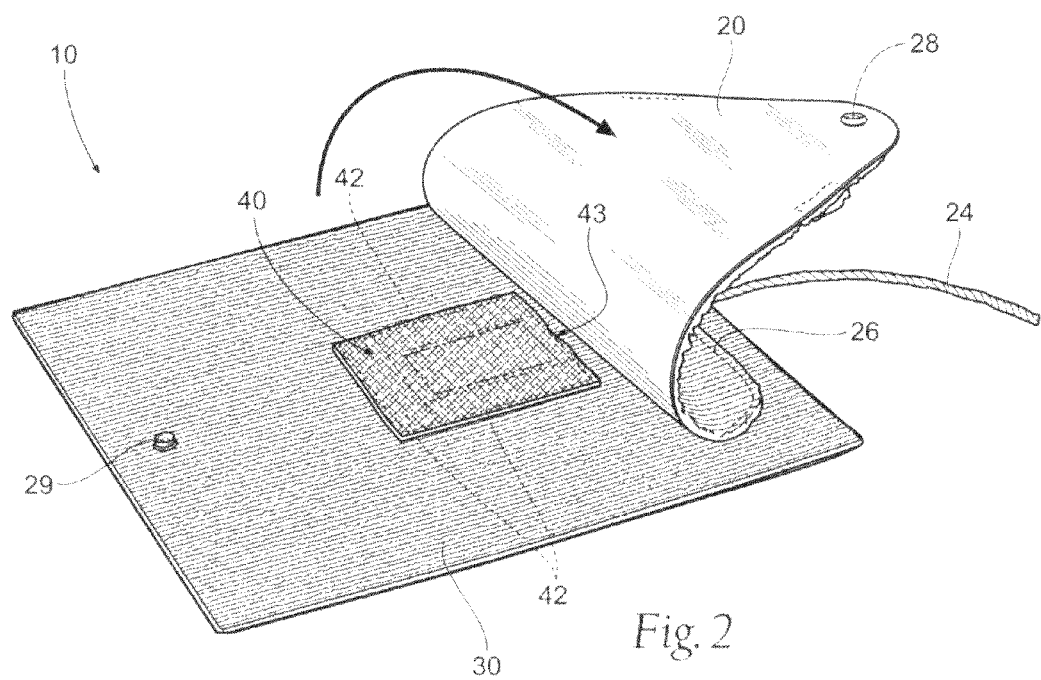
FIG. 2 is a perspective view of the apparatus of FIG. 1 with a free end of an overlay, or partial cover, detached from a planar base and pulled back for ready access to a supporting planar base and a gas permeable receptacle or retainer for holding catnip or other animal attractant.

FIGS. 1 and 2 are perspective views of an amusement apparatus 10 having a supple material overlay 20 that is attached to the planar base 30 and partially covers a retainer 40, or receptacle, such as an elastic band, hook, or any other retention means which restricts the ability of the animal, such as a cat, to access the animal attractant, such as catnip, held within the retainer 40.

The supple overlay 20 and planar base 30 may be made of the same material. In a preferred embodiment, both the supple overlay 20 and base 30 are made of carpeting material with a supple, rubber-like backing, but they may, alternatively, be made of sisal fabric or rope, or any other durable material that is appropriate for an animal, such as a cat, to scratch or climb. The term "supple" used herein refers to a material that bends readily without breaking and is characterized by ease in doing so.

While the illustrated apparatus 10 resembles a mouse, it is noted that it can alternatively form another figure or may not be representative of any recognizable figure, while supporting the essential elements defined by the claims as set forth herein. The illustrated apparatus, representational of a mouse, includes artificial ears 22 and a tail 24. The ears 22 may be made from same material as the planar base 30 and the overlay 20, and the tail 24 from a piece of cord or rope; although the present invention is not limited to such materials. The ears 22 are preferably stitched to the top of the overlay 20, and the tail 24 is preferably stitched between the planar base 30 and the overlay 20. These non-necessary pieces may also serve as extra sources of entertainment for the animal, such as a cat, in addition to the aesthetic purpose. To complete the appearance of a mouse, the overlay 20 is preferably cut wider on one end, representational of the body, and narrows on the opposing end, representational of the head, face, and nose of the mouse configuration; however, the overlay 20 is not limited to this shape.

As shown in FIG. 1, the supple material overlay 20 may be attached to the planar base by stitching 26 or any other means of attachment. At least one end may be attached with a releasable fastener 28. Fastener 28 may be any suitable device with compatible parts being respectively attached to the base 30 and to the overlay 20, such as a snap, or hook and loop fastener, the latter conventionally known by the trademark VELCRO®, for example. Alternatively, both ends may be releasably attached to the planar base 30 by any suitable releasable device described previously.

Figure 4:
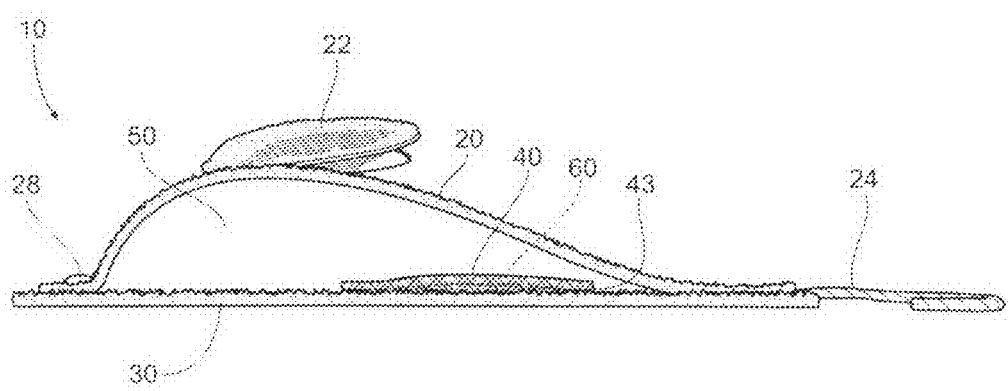
FIG. 4 is a side view of the apparatus of FIG. 1 exhibiting an arch-like gap defined by the underside of the overlay and the exposed surface of the planar base when opposite ends are attached to said base.

As shown in FIG. 4, the releasable fastener 28 on the overlay 20 is set 1.0625 inches (2.7 cm) beyond its counterpart 29 on the planar base 30 so that when the fastener 28 and counterpart 29 are joined, an arch-like gap 50 is formed. As previously noted, an important aspect of this invention is to provide maximum exposure to the scent of the animal attractant, such as catnip, and stimulate play. This gap 50 facilitates this purpose by allowing the animal partial access to the retainer 40 (to be hereinafter described) adapted to hold the animal attractant 60, such as catnip.

Figure 3:
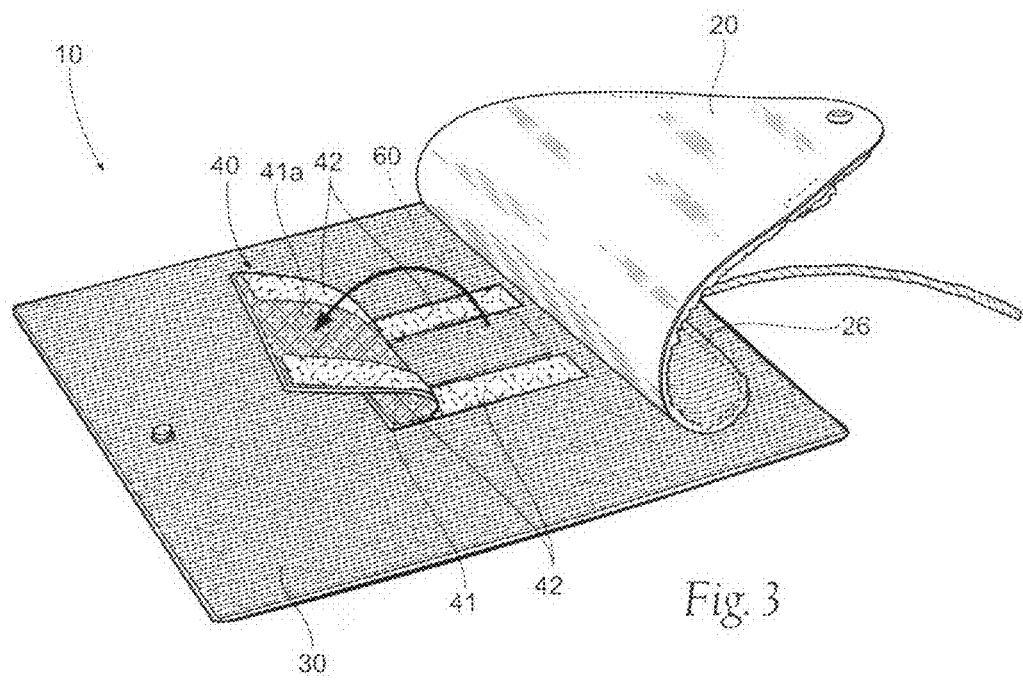
FIG. 3 is a perspective view of the apparatus of FIG. 1 with a free end of an overlay detached from the base and pulled back, and with the retainer shown opened for ready receipt of catnip or other animal attractant.

Generally, a retainer 40 for holding a quantity of the odor-emitting animal attractant 60, such as catnip is configured such that the attractant may be inserted and removed as necessary. This retainer 40 is formed by a fabric cover 41 preferably attached to the planar base 30. The fabric is preferably a woven material such as burlap, but may be any gas permeable, porous material that will allow the attractant scent of catnip to escape from the retainer 40. The cover 41 is preferably attached to the planar base 30, but may alternatively be attached to the underside of the supple overlay 20. The periphery of the cover 41 may be substantially attached by a releasable fastener(s) 42, such as double-sided adhesive tape or hook and loop fastener, as shown in FIGS. 2 and 3, with an opening 43 left unattached. Alternatively, the periphery of the cover 41 may be wholly attached by releasable fasteners. In yet another alternative, the periphery of the cover 41 may be permanently attached in at least one area to restrict complete removal of retainer cover 41, but to maintain an opening 43 conducive to receiving or removing catnip 60. This satisfies an object of the invention—to maximize longevity of the apparatus by allowing for replacement of the animal attractant when it becomes stale or otherwise ineffective.

In a preferred embodiment, the opening 43 is oriented towards the permanently attached end 25 of the overlay 20, but any orientation may be suitable.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. An animal amusement apparatus, said apparatus including:
   a supporting planar base having an exposed surface to which components of said apparatus are attached; a retainer located on the top surface of said base;
   a supple material overlay containing a first end securely fastened to said base and a second end detachably secured to said base by a releasable fastener comprising a first compatible member and a second compatible member, wherein said first compatible member is attached to said base and said second compatible member is attached to said supple material overlay;
   wherein said first compatible member is longitudinally spaced relatively short of said second compatible member to thereby provide, and conjointly define, an open arch-like gap extending upwardly from said base and providing limited access to said retainer; and
   wherein said retainer configured for receipt of an odor emitting animal attractant and being disposed between said base and said overlay.

2. The amusement apparatus of claim 1 wherein the releasable fastener comprises a clasp comprising oppositely disposed, compressibly joinable, snap-acting, members.

3. The amusement apparatus of claim 1 wherein the releasable fastener comprises compatible members joinable together by means of a hook and loop fastener.

4. The apparatus defined in claim 1 wherein said retainer comprises a material permeable to odors emitted from odor emitting animal attractant contained within said retainer.

5. The apparatus as defined in claim 4 wherein said retainer has a peripheral portion attached to said planar base.

6. The apparatus as defined in claim 4 wherein said retainer has a peripheral portion releasably attached to said planar base.

7. The apparatus as defined in claim 1 wherein said odor emitting animal attractant is catnip.

8. The apparatus as defined in claim 1 wherein said overlay and planar base are made of a carpet material.

9. The apparatus as defined in claim 8 wherein said carpet material contains fibrous sisal material.

10. The apparatus as defined in claim 1 wherein said overlay is backed with a supple, rubber-like underside.

11. The apparatus as defined in claim 1 wherein said planar base is backed with a rubber-like underside.

12. An amusement apparatus as in claim 1 wherein said apparatus is representational of a mouse or other recognizable figure.

13. An animal amusement apparatus, said apparatus including:
   a supporting planar base;
   a retainer located on the top surface of said base, said retainer adapted to receive cat
   a supple material overlay containing a first end securely fastened to said base and a second end detachably secured to said base by a releasable fastener comprising a first compatible member and a second compatible member, wherein said first compatible member is attached to said base and said second compatible member is attached to said supple material overlay; wherein said first compatible member is longitudinally spaced relatively short of said first end second compatible member to thereby provide, and conjointly define, an open arch-like gap extending upwardly from said base and providing limited access to said retainer; and wherein said retainer is being disposed between said base and said overlay.

14. The overlay as defined in claim 13 wherein said releasable fastener comprises compatible members joinable together by means of snapping action.

15. The overlay as defined in claim 13 wherein said releasable fastener comprises compatible members joinable together by hook and loop fastener.

16. The apparatus defined in claim 13 wherein said retainer has a cover that comprises an odor-permeable material.

17. The apparatus as defined in claim 13 wherein said overlay and planar base are made of a carpet material.

18. The apparatus as defined in claim 13 wherein said overlay and planar base are made of a sisal material.

* * * * *